N. PETERSON.
ANTIFREEZE HEAD GATE.
APPLICATION FILED AUG. 5, 1919.
1,377,921.
Patented May 10, 1921.
2 SHEETS—SHEET 1.
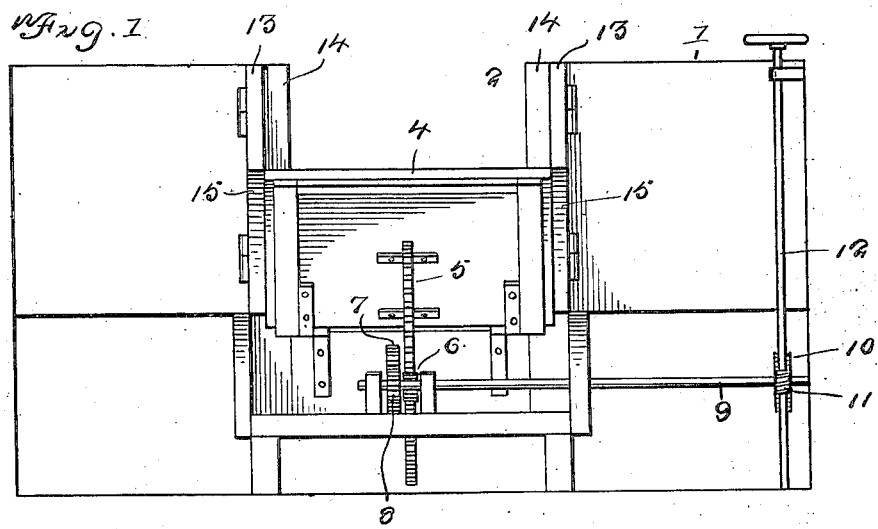
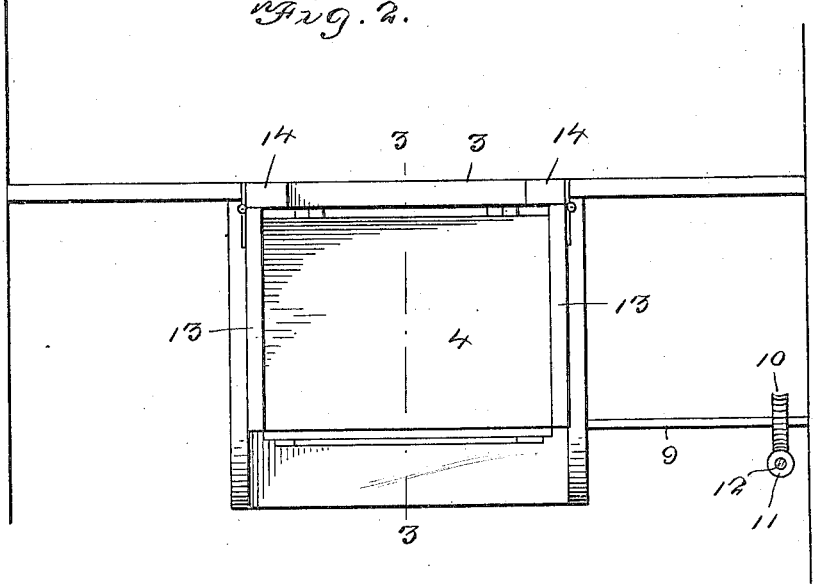
WITNESS:
E. R. Ruppert
N. Peterson
INVENTOR.
BY
Victor J. Evans
ATTORNEY.

N. PETERSON.
ANTIFREEZE HEAD GATE.
APPLICATION FILED AUG. 5, 1919.
1,377,921.
Patented May 10, 1921.
2 SHEETS—SHEET 2.
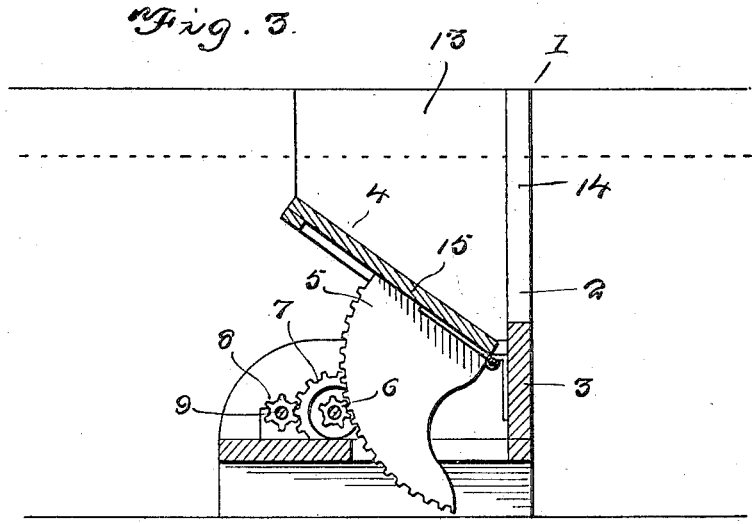
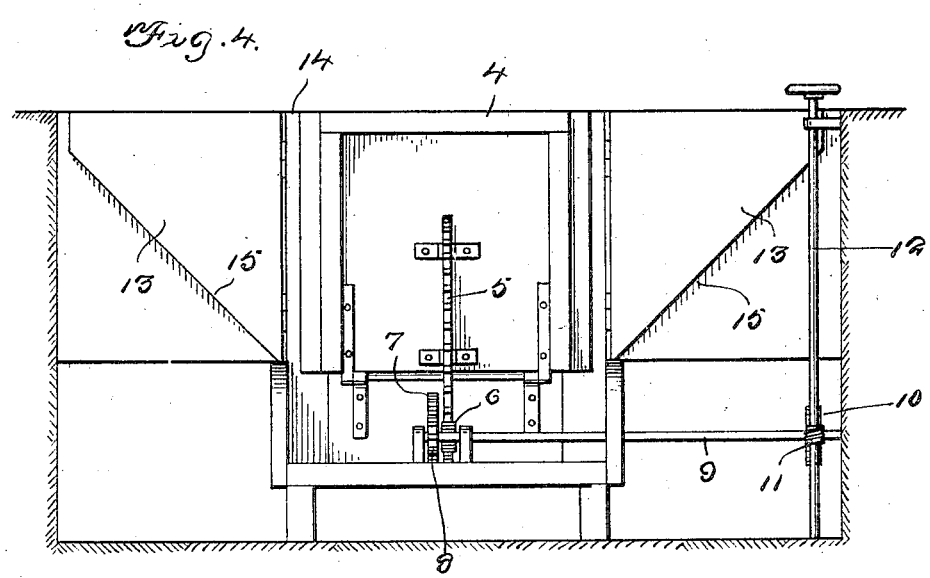
WITNESS:
E. R. Ruppert
N. Peterson
INVENTOR.
BY
Victor J. Evans
ATTORNEY.

UNITED STATES PATENT OFFICE.

NIELS PETERSON, OF ST. ANTHONY, IDAHO.

ANTIFREEZE HEAD-GATE.

1,377,921.   Specification of Letters Patent.   Patented May 10, 1921.

Application filed August 5, 1919. Serial No. 315,475.

*To all whom it may concern:*

Be it known that I, NIELS PETERSON, a citizen of the United States, residing at St. Anthony, in the county of Fremont and State of Idaho, have invented new and useful Improvements in Antifreeze Head-Gates, of which the following is a specification.

This invention relates to head gates for dams and the principal object of the invention is to provide means for causing the water to flow over the top of the gate so as to prevent the freezing of the water around the movable parts and also to prevent the parts of the gate from catching and holding blocks of ice or trash.

Another object of the invention is to provide means whereby the gate with its operating parts is located below the water level when the gate is open so as to permit free passage of the water over the same.

Still another object of the invention is to provide adjustable wings for directing the water over the gate when the same is in partly raised position.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a front view of the invention;

Fig. 2 is a plan view with the gate in partly raised position and the wings open;

Fig. 3 is a section on line 3—3 of Fig. 2;

Fig. 4 is a front view with the gate in raised position and the wings folded.

In these views 1 indicates a portion of the dam and 2 indicates the chute through which the water flows from the dam. This chute has an upright piece 3 across its mouth and the upper edge of this upright is below the water level. The gate 4 has its lower edge hinged to this upright. The downstream face of this gate has secured thereto a quadrant gear 5 which passes through a slot in the bottom of the chute. This gear is engaged by a pinion 6 which is connected with a gear wheel 7 and this gear wheel is engaged by a small gear wheel 8 located on a shaft 9. This shaft is provided with a worm 10 which is engaged by a worm gear 11 on the upright shaft 12 which is suitably supported in a part of the dam and the upper end of which is adapted to be engaged by any suitable means for causing the shaft to rotate to operate the connections to the gate to raise and lower the same.

As will be seen, the gate, when lowered, and its operating parts are located below the water level so that the free passage of the water will not be obstructed by any of these parts when the gate is in lowered position. Thus the operation of the gate will not be interfered with on account of the water freezing and the different parts of the gate will not act to catch the ice or trash in the water.

In order to direct the water over the partly open gate, I provide the wings or shutters 13 which are hinged to the posts 14 at the sides of the chute. These wings or shutters have their lower ends beveled as at 15 so as to engage the gate when the same is held in inclined position. In this way the water in the dam may be held at different levels while the surplus water will flow over the top of the gate. Any desired means may be used for holding the wings or shutters in open position. When these wings are not in use they may be folded back against the dam.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A head gate of the class described comprising a gate hinged at its lower end to a part of the dam, means for raising and lowering the gate and side wings hinged to a part of the dam and having their lower edges beveled to engage the gate when partly raised.

In testimony whereof I affix my signature.

NIELS PETERSON.